(12) United States Patent
Rathor et al.

(10) Patent No.: US 11,689,949 B1
(45) Date of Patent: Jun. 27, 2023

(54) AUTOMATED SERVICE REQUEST

(71) Applicant: Rakuten Symphony Singapore Pte. Ltd., Singapore (SG)

(72) Inventors: Sandeep Rathor, Madhya Pradesh (IN); Sachin Choudhary, Madhya Pradesh (IN); Arpit Gangwal, Madhya Pradesh (IN)

(73) Assignee: RAKUTEN SYMPHONY SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 17/703,986

(22) Filed: Mar. 25, 2022

(51) Int. Cl.
| | | |
|---|---|---|
| H04W 24/08 | (2009.01) | |
| H04L 43/0817 | (2022.01) | |
| H04L 43/067 | (2022.01) | |
| H04L 43/062 | (2022.01) | |
| H04L 43/045 | (2022.01) | |

(52) U.S. Cl.
CPC .......... *H04W 24/08* (2013.01); *H04L 43/045* (2013.01); *H04L 43/062* (2013.01); *H04L 43/067* (2013.01); *H04L 43/0817* (2013.01)

(58) Field of Classification Search
None
See application file for complete search history.

(56) References Cited

U.S. PATENT DOCUMENTS

| | | | | |
|---|---|---|---|---|
| 9,768,893 | B1 * | 9/2017 | Wank | H04B 17/0085 |
| 2009/0003225 | A1 * | 1/2009 | Klassen | H04L 43/50 |
| | | | | 370/250 |
| 2010/0008248 | A1 * | 1/2010 | Constantine | H04L 43/50 |
| | | | | 370/252 |

* cited by examiner

*Primary Examiner* — Anh Nguyen
(74) *Attorney, Agent, or Firm* — Hauptman Ham, LLP

(57) ABSTRACT

A method includes determining a set of test locations based on a network parameter; and determining a subset of the test locations that do not have a point test equipment. The method includes determining a drive test route to cover an area serviced by each the subset of the test locations. The method includes receiving a notification from a drive test equipment in response to the drive test equipment arriving at a first test location on the drive test route. The method includes sending test parameters to the drive test equipment; and receiving a drive test result from the drive test equipment. The method includes determining whether the drive test results meet a drive test specification. The method includes requesting the drive test equipment to relocate to a second test location in response to a determination that the drive test results meet the drive test specification.

20 Claims, 4 Drawing Sheets

US 11,689,949 B1

AUTOMATED SERVICE REQUEST

BACKGROUND

Open Radio Access Network (RAN) is a standard for RAN interfaces that allow interoperability of equipment between vendors. Open RAN networks allow flexibility in where the data received from the radio network is processed. Open Ran networks allow processing of information to be distributed away from the base stations. Open RAN networks allow managing the network at a central location.

Signal parameters of a cellular network are measured in a cell site using a test script that runs on user equipment.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
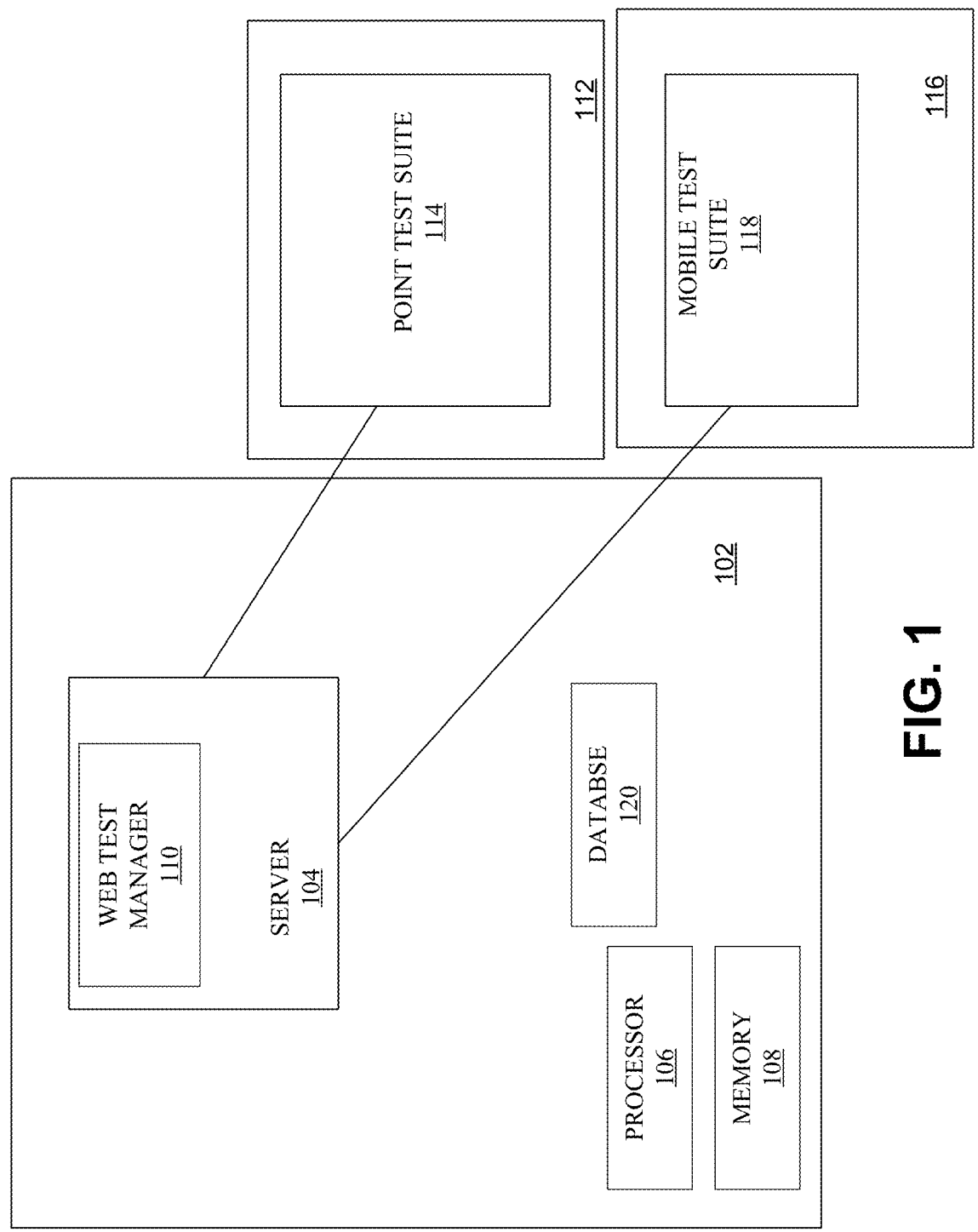
FIG. 1 is a diagram of a system for automated signal testing, according to at least one embodiment of the present system.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

In some embodiments, a system automates drive testing of an Open RAN network using a webserver and a script for a test equipment. For example, the system generates a drive testing route to assign one or more testing equipment based on the prior signal information from prior tests to reduce the resources utilized for network evaluation. In some embodiments, the system generates a drive testing route based on information about a phase of deployment such as after installation of a Radio Unit, changing parameters of the signal on the Radio Unit, or the like. In some embodiments, the system evaluates information received from the testing equipment to determine whether the results meet the testing specification automated processes performed using discretion of a human. In some embodiments, the system determines whether the results are desired in a specific location in a cell site based on the call quality or signal strength data stored in a database without human intervention. In some embodiments, the system automates the analysis and reporting of test data received from the test equipment without intervention of the user.

In some embodiments, the system determines whether further information at a location in the cell site is desired based on data from prior tests to redirect resources such as a test drive vehicle to the location. In some embodiments, the system reassigns drive test locations to a different testing device based on failure of a task at the location. In some embodiments, the system provides logs of prior tests which are usable by drive future tests or help trouble shoot errors in the network instead of a random test drives to identify errors. In some embodiments, the system is able to use a combination of a mobile test unit and a fixed test unit at a location to automate and reduce the effort in optimizing performance of the network.

FIG. 1 is a diagram of a system 100 for automated drive testing, according to at least one embodiment of the present system. The diagram includes system 100 for hosting a cloud architecture 102. In some embodiments, the system 100 includes components described hereinafter in FIG. 4. In some embodiments, the system 100 hosts a cluster of servers, such as a cloud service. In some embodiments, the system 100 hosts a public cloud. In some embodiments, the system 100 hosts a private cloud.

In some embodiments, the system 100 includes a server 104, a processor 106 and a memory 108. In some embodiments, the system 100 includes a test software running on a drive test device 116 and a corresponding web application 110 running on a server 104 in communication with the drive test device 116. In some embodiments, the system 100, includes a point test suite 114 running on a point test device 112. For example, the point test device 112 is positioned at a fixed location to allow tests to be run from the server 104 at a predetermined time, periodically or in response to a request to trouble shoot a network issue. In some embodiments, the drive test device 116 and the point test device 112 are modified user equipment such as cellular phones. In at least one example, the cellular phones run an application that communicates with the web application, performs the tests, and reports the results from the tests to the web application 110.

In some embodiments, the web application 110 has access to testing data stored in a database 120. In some embodiments, the web application 110 automates testing using the point test suite 114 on the point test device 112. In some embodiments, the web application 110 automates testing using the mobile test suite 118 on the mobile test device 116.

In some embodiments, the web application 110 determines a set of test locations based on a network parameter. For example, the web application 110 accesses logs on an Open RAN network that indicate a location with inadequate signal strength that is at variance with a network deployment plan based on the network parameters at the corresponding location. Examples of network parameters include signal strength, quality of service, signal to noise ratio, or the like. In some embodiments, the web application 110 accesses logs on the Open RAN network from prior drive tests to identify a set of locations as targets for gathering test information. In some embodiments, the web application 110 determines the set of test locations based on a stage of the deployment or optimization of the network. For example, the web application 110 determines the set of test locations based on a realigned beam of a radio unit in a cell site.

In some embodiments, the web application 110, determine a subset of the test locations that does not have the point test equipment 112. In some embodiments, the web application 110 determines whether the set of locations where data is to be acquired matches the locations with the point test equipment 112 based on the geo location information of the point test equipment 112.

In some embodiments, the web application 110 determines a drive test route to cover the subset of the test locations that do not have the point test equipment 112. In some embodiments, the web application 110 runs a Monte Carlo simulation on the different routes to determine a time efficient route to minimize the recourses spent on the test drive. In some embodiments, the web application 110 determines the test route based on a map of the routes available close to the test location, the time to drive to the set of locations. In some embodiments, the web application 110 runs simulations to optimize the problem of deploying the resources available to reduce or minimize the time for the tests and to accelerate improvements in quality of service of the network and to trouble shoot the network.

In some embodiments, the web application 110 receives a notification from a drive test equipment when the drive test equipment arrives at a first test location on the drive test route. In some embodiments, the web application 110 receives a notification when the drive test equipment arrives at the global positioning coordinates of the first test location. In some embodiments, the web application 110 periodically queries the location of the drive test equipment 112 to track the progress of the drive test.

In some embodiments, the web application 110 sends test parameters to the drive test equipment 112. In some examples, the test parameters are based on the equipment manufacturer specification, the details about the deployment of the network, or the like. In some embodiments, the web application 110 receives a drive test result from the drive test equipment 112 after completing the test. In some embodiments, the drive test suite 118 includes a script that automatically sends the test results to the web application 110.

In some embodiments, the web application 110 determines whether the drive test results meet the test specification. In some embodiment, the web application 110 determines whether the drive test result meets the specification based on a threshold. In some embodiments, the threshold is based on the number of tests run and the number of tests that resulted in information indicating acceptable network performance. In some embodiments, the threshold is based on the results being within a range indicating normal operation for a vendor based on the specifications from the vendor.

In some embodiments, the web application 110, based on a determination that the drive test results meet the drive test specification, sends a request to the drive test equipment to relocate to a second test location on the drive test route. In some embodiments, the web application 110 directs the drive test equipment 116 to relocate based on the real-time tracking of the test results. In some embodiments, the web application 110 directs the drive test equipment 116 to relocate based on traffic patterns received from external devices. In some embodiments, the web application 110 moves the test location between multiple drive test equipment to minimize the time to obtain test results.

In some embodiments, the web application 110 determines a set of signal parameters based on the drive test result. In some embodiments, the set of signal parameters includes a signal to noise ratio, the signal strength, or the signal quality of the drive test. In some embodiments, the web application 110 generates visual results for the signal parameters based on the drive test data. In some embodiments, the web application 110 determines a set of signal parameters based on the drive test result. In some embodiments, the set of signal parameters includes locations where the signal parameters such as the signal strength are not in line with the deployment plan. The web application 110 determines a set of locations for further testing based on the set of signal parameters being not in line with the deployment plan.

In some embodiments, the web application 110 sends test parameters to the point test equipment 112 at the subset of test locations that has a point test equipment for execution at a predetermined time. The point test equipment 112 is managed remotely by the web application 110 and automatically transmits the point test results. In some embodiments, the web application 110 receives the drive test results from the drive test equipment. The web application 110 combines the results from the drive test result and the point test result to determine the real-time key performance indicators (KPIs) of the network.

In some embodiments, the web application 110 determines a set of signal parameters based on the point test result and the drive test result. The web application 110 then determine a set of locations for further testing based on the set of signal parameters that are derived from both the point test locations and the drive test locations. For example, the web application 110 determines the expected set of signal parameters at a location based on extrapolation of the set of signal parameters from the nearest point test location. In some embodiments, the web application 110 determines the set of test locations for further testing based on the extrapolation and the measured result at a prior test location exceeding an extrapolation threshold. The web application 110 determines the extrapolation threshold based on a value that does not inordinately increase the computing resources and time to optimize the network.

In some embodiments, the web application 110 determines a set of signal parameters based on the point test result. In some embodiments, the web application 110 determines a set of locations for further testing based on the set of signal parameters. In some embodiments, the web application 110 determines a set of signal parameters based on the point test result and the drive result. In some embodiments the web application 110 generates a visual representation of the signal parameters via a graphical user interface.

In some embodiments, the web application 110 receives information about the network parameters via a graphical user interface.

Figure 2:
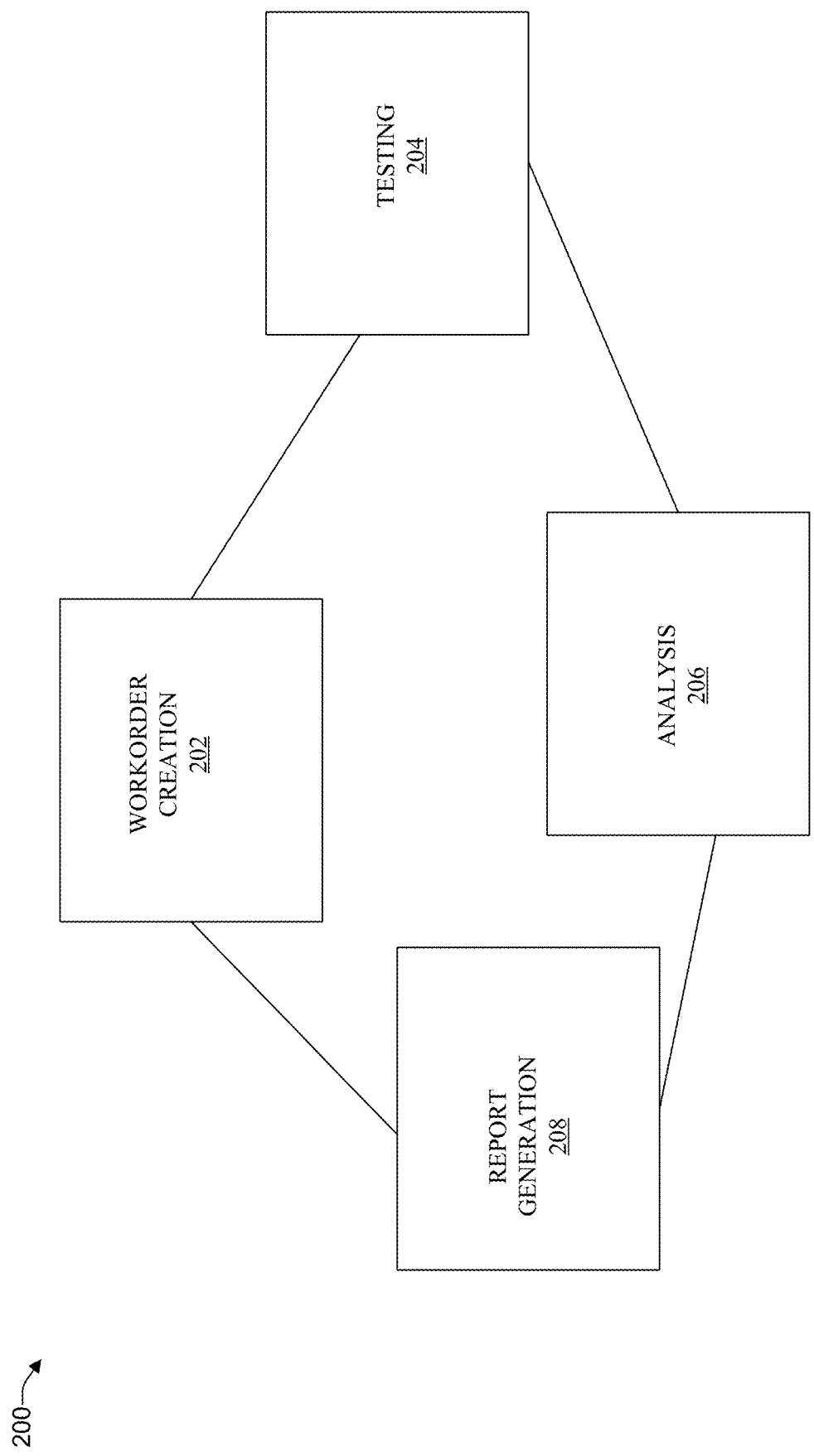
FIG. 2 is a diagram of a workflow for automated signal testing, according to at least one embodiment of the present system.

FIG. 2 is a workflow for automated drive testing, according to at least one embodiment of the present system. In some embodiments, the steps include work order creation 202, testing 204, analysis 206 and report generation 208. In some embodiments, the web application, e.g., the web application 110 (FIG. 1), determines a work order for testing based on a script that analyzes the information in the logs, e.g., received from the database 120 (FIG. 1). In at least one example, a cloud service, such as an event handler, analyzes the events from the tests such as drive test results and the point test results from the drive test device and the point test device respectively. In some embodiments, the work order creation script 202 determines, based on the events and logs in real-time, the progress of the drive test. In some embodiments, the web order creation script 202 optimizes the drive test based on current traffic conditions, current network congestion, or the like. In some embodiments, the testing script 204 receives the test parameters from the web application and executes the tests. In some embodiments, the testing script 204 periodically runs testing scripts for the point the point test results and returns the results to the web application.

In some embodiment, the testing script 204 runs the testing scripts based on the location of the drive testing device. In some embodiments, the drive testing device requests validation of the test results prior to moving to the second location on the drive test route. In some embodiments, the drive testing device moves to the second location on the test route after the testing is complete. In some embodiments, the testing script 204 uploads the information before moving to the next location on the drive test route.

In some embodiments, the workflow moves to the analysis script 206. The analysis script 206 validates the point test results based on the point test requirements sent to the point test device. The analysis script 206 validates the drive test results based on the drive test requirements sent to the point drive test device.

In some embodiments, the analysis script 206 determines the real-time signal parameters of the network. The analysis script 206 helps to improve optimization of the network, for example using e-tilt of the Radio. In some embodiments, the feedback loop is used to periodically optimize the Open RAN network based on the test results which in turn help determine the test points.

In some embodiments, the report generation script 208 generates logs with the test results and generates visual representations of the test results for ease of review. In some embodiments, the report generation script 208 stores information that allows determination of additional testing points or retest of locations where the tests failed or were not adequate to properly determine network performance.

Figure 3:
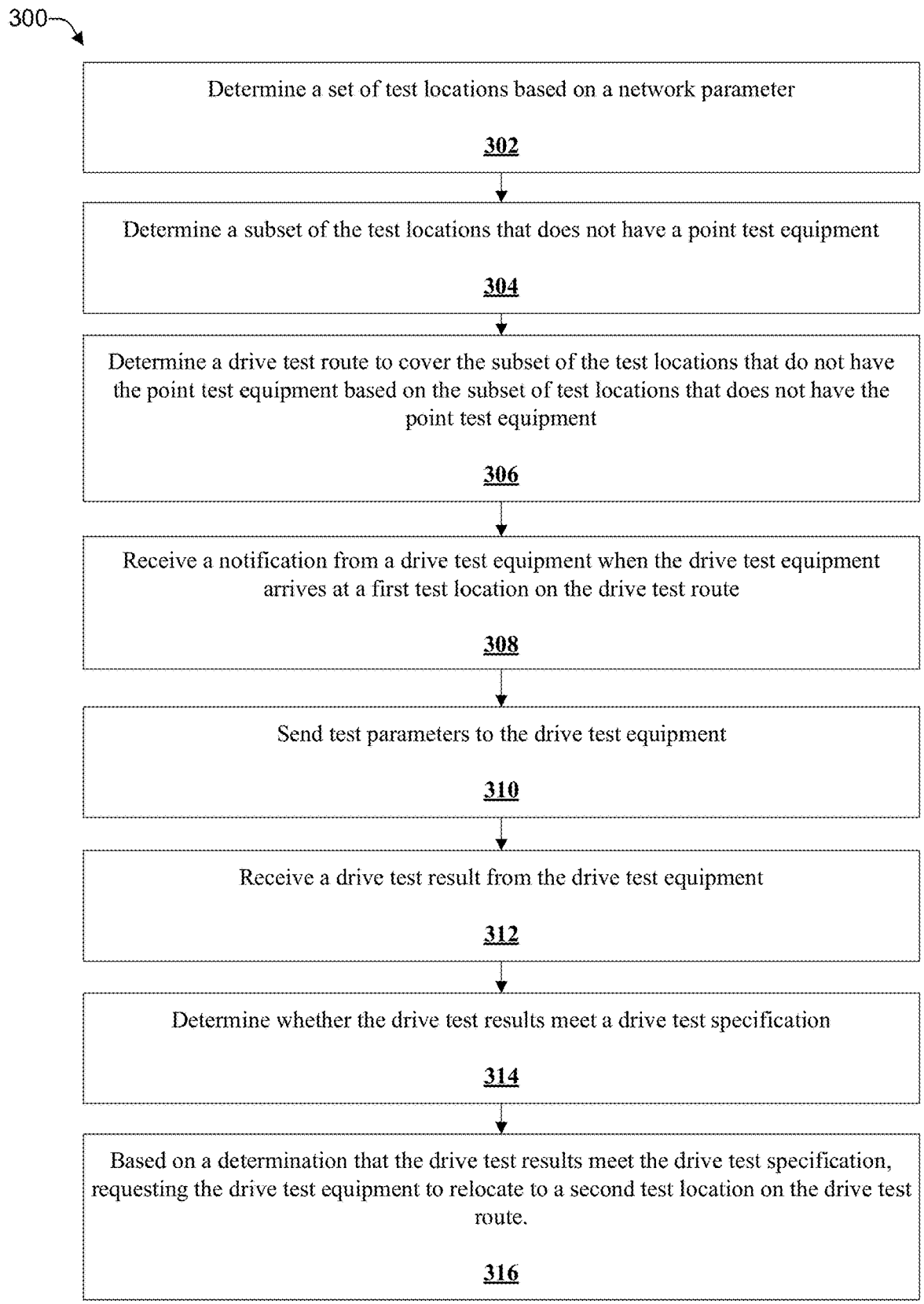
FIG. 3 is an operational flow of a method for automated signal testing in the network, according to at least one embodiment of the present system.

FIG. 3 is an operational flow for a method 300 of determining a faulty node in a network in accordance with at least one embodiment. In some embodiments, the method 300 is implemented using a controller of a system, such as system 100 (FIG. 1), or another suitable system. In at least some embodiments, the method is performed by the system 100 shown in FIG. 1 or a controller 400 shown in FIG. 4 including sections for performing certain operations, such as the controller 400 shown in FIG. 4 which will be explained hereinafter.

At operation 302, the controller, determines a set of test locations based on a received information related to a network parameter. In some embodiments, the controller receives information about the network parameter from a database, e.g., database 120 (FIG. 1). Examples of the network parameter includes signal quality, quality of service information, information from prior tests, the coverage area of a cell site, the topography of the cell site, or the like. In at least one example, the controller determines locations where a fresh test is to be performed, based on a time period since a test was performed at the location or a change occurring at the location, to obtain additional information for optimizing the network. For example, the controller changes the beam angle based on test data to realign the target of a radio unit in a cell site to enhance reception in a frequently used area. In some embodiments, the controller determines the locations based on locations where data is currently unavailable or inadequate to optimize the cellular network.

At operation 304, the controller determines a subset of the test locations that does not have a point test equipment. In some embodiments, the controller receives test data based on test parameters sent to testing equipment. In some embodiments, the test equipment is a point testing equipment that is located a fixed point. In some embodiments, the test equipment is drive test equipment that is moved from one location to another. In some embodiments, the controller identifies the subset of the test locations based on those locations which lack data or additional information and are not equipped with point test equipment at the location.

At operation 306, the controller determines a drive test route to cover at least a portion of the subset of the test locations that do not have the point test equipment. In some embodiments, the drive test route covers all of the subset of test locations. In some embodiments, the drive test route covers less than all of the subset of test locations. In some embodiment, the controller determines the subset of test locations to add to a drive test route based on the subset of test locations that does not have the point test equipment. In some embodiments, the controller uses the geographical location of the test locations for which a drive test is desired to increase an area covered by the drive test at multiple locations. In some embodiments, the controller optimizes the route based on a map of roads available to drive to a first test location, and then drive to a subsequent test location. In some embodiments, the controller requests a drive test equipment to relocate to a different location to perform a test.

In some embodiments, at S308 the controller receives a notification from a drive test equipment when the drive test equipment arrives at a first test location on the drive test route. In an example, the controller receives information from the drive test equipment via the radio network along with the coordinates to a test software on the user equipment.

At operation 310, the controller sends test parameters to the drive test equipment. In some embodiments, the test parameters are sent wirelessly. In some embodiments, the controller determines the test parameters to be sent based on the information received from an equipment manufacturer. In some embodiments, the controller sends test parameters based on the prior tests when some of the parameters are not available or some of the prior tests failed. In some embodiments, the controller sends the parameters to a drive test software running on the drive test equipment. In some embodiments, the drive test software receives and transmits information to the server located on the cloud network to interactively run the test. In some embodiments, the drive test software produces the results of the test to the web server after completion of the test.

At operation 312, the controller receives a drive test result from the drive test equipment. In some embodiments, the results of the drive test are automatically uploaded to the server. In some embodiments, the drive test software initially performs a check to determine if the test parameters were satisfied during the test. In some embodiments, the drive test software requests the server to perform a check to determine if the test parameters are satisfied.

At operation 314, the controller determines whether the drive test results meet a drive test specification. In some embodiments, the drive test specification includes information about the tests and the data that is expected from the test. In some embodiments, the controller determines that the drive tests results do not meet the drive test specification in response to failure to collect data sufficient to match the drive test specification. In some embodiments, the test results fail momentarily due to different reasons, such as temporary congestion in either a cell site or backhaul, or the like. In some embodiments, the controller marks a test result as failed based on other information received from the point test device close to the drive test location. In some embodiments, in response to a determination that the drive test failed, the controller instructs the drive test to be repeated. In some embodiments, in response to a determination that the drive test failed, the controller generates instructions for a repair/replacement crew to visit the location of the failed drive test to replace or repair hardware at the location. In some embodiments, in response to a determination that the drive test failed, the location is selected as a subset location for a future drive test. In some embodiments, in response to a determination that the drive test failed, the location is selected to have fixed point test equipment installed to facilitate future monitoring of the location.

At operation 316, the controller, based on a determination that the drive test results meet the drive test specification, requests the drive test equipment to relocate to a next test location on the drive test route. In some embodiments, the controller, based on the test results meeting the drive test specification, sends instructions to the drive test equipment to move to the next location on the drive test. In some embodiments, the controller, based on the test results not meeting the drive test specification, sends instructions to the drive test equipment to try the test again before moving to the next location on the drive test.

Figure 4:
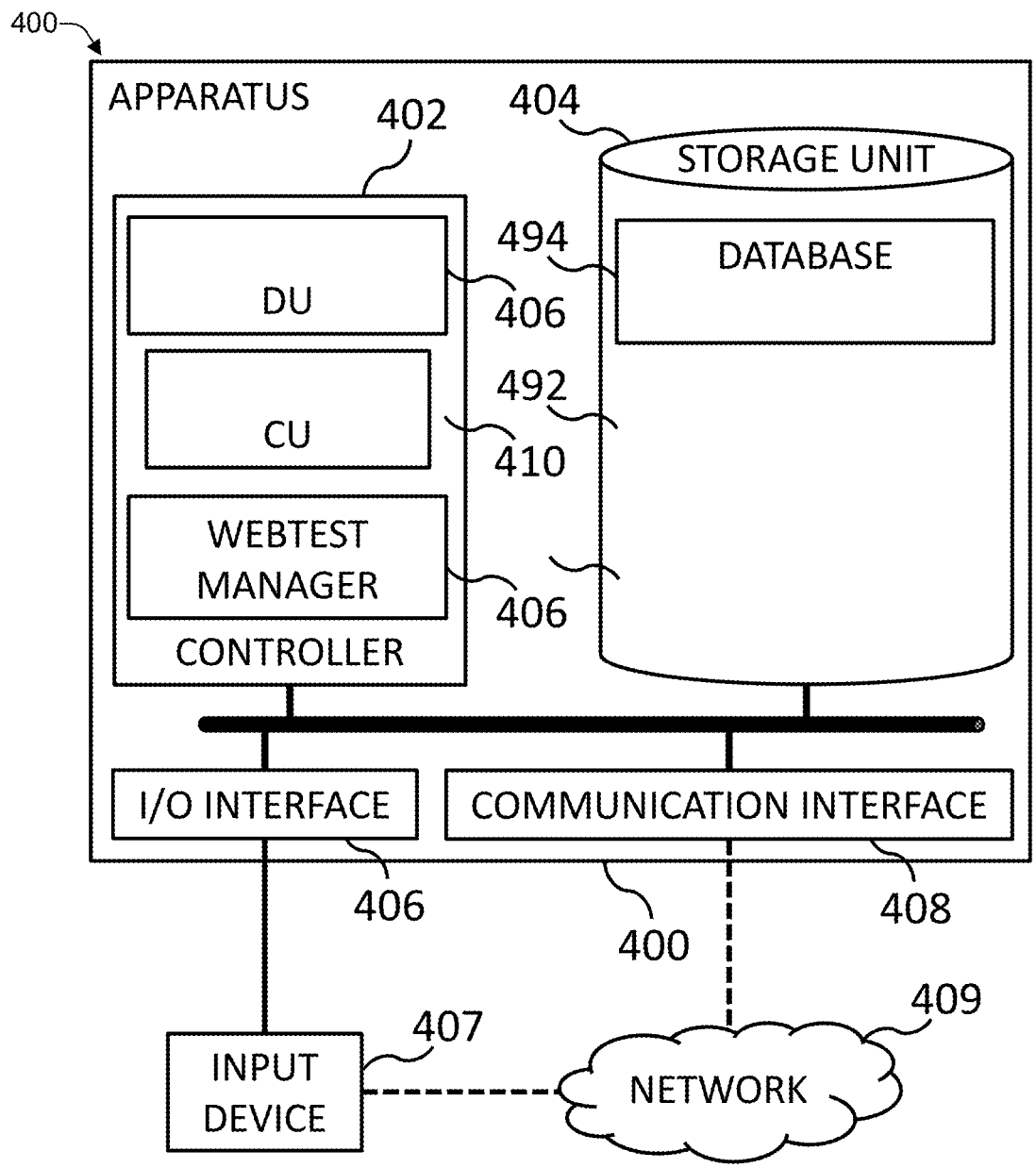
FIG. 4 is a block diagram of an exemplary hardware configuration for automatic cell range detection, according to at least one embodiment of the present system.

FIG. 4 is a block diagram of an exemplary hardware configuration for testing the network from a centralized web server, according to at least one embodiment of the system. The exemplary hardware configuration includes the system 100, which communicates with network 409, and interacts with input device 407. In at least some embodiments, apparatus 400 is a computer or other computing device that receives input or commands from input device 407. In at least some embodiments, the system 100 is a host server that connects directly to input device 407, or indirectly through network 409. In at least some embodiments, the system 100 is a computer system that includes two or more computers. In at least some embodiments, the system 100 is a personal computer that executes an application for a user of the system 100.

The system 100 includes a controller 402, a storage unit 404, a communication interface 408, and an input/output interface 406. In at least some embodiments, controller 402 includes a processor or programmable circuitry executing instructions to cause the processor or programmable circuitry to perform operations according to the instructions. In at least some embodiments, controller 402 includes analog or digital programmable circuitry, or any combination thereof. In at least some embodiments, controller 402 includes physically separated storage or circuitry that interacts through communication. In at least some embodiments, storage unit 404 includes a non-volatile computer-readable medium capable of storing executable and non-executable data for access by controller 402 during execution of the instructions. Communication interface 408 transmits and receives data from network 409. Input/output interface 406 connects to various input and output units, such as input device 407, via a parallel port, a serial port, a keyboard port, a mouse port, a monitor port, and the like to accept commands and present information.

Controller 402 includes the Radio Unit (RU), the Distributed Unit (DU), the Webtest Manger 506 and the core 114. In some embodiments, the Radio Unit (RU), a Distributed Unit (DU), a centralized Unit (CU), the Webtest Manager 506 and a core are configured based on a virtual machine or a cluster of virtual machines. The DU, CU, the Webtest Manager, core, or a combination thereof is the circuitry or instructions of controller 402 configured to process a stream of information from a DU, CU, Webtest Manager, core, or a combination thereof. In at least some embodiments, DU, CU, the Webtest Manager, core, or a combination thereof is configured to receive information such as information from an open-RAN network. In at least some embodiments, the DU, CU, Webtest Manager, core, or a combination thereof is configured for deployment of a software service in a cloud native environment to process information in real-time. In at least some embodiments, the DU, CU, core, or a combination thereof records information to storage unit 404, such as the database 490, and utilize information in storage unit 404. In at least some embodiments, the DU, CU, Webtest Manager, core, or a combination thereof includes sub-sections for performing additional functions, as described in the foregoing flow charts. In at least some embodiments, such sub-sections may be referred to by a name associated with their function.

In at least some embodiments, the apparatus is another device capable of processing logical functions in order to perform the operations herein. In at least some embodiments, the controller and the storage unit need not be entirely separate devices but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all the blocks of flowcharts and block diagrams described herein. Various embodiments of the present system are described with reference to flowcharts and block diagrams whose blocks may represent (1) steps of processes in which operations are performed or (2) sections of a controller responsible for performing operations. Certain steps and sections are implemented by dedicated circuitry, programmable circuitry supplied with computer-readable instructions stored on computer-readable media, and/or processors supplied with computer-readable instructions stored on computer-readable media. In some embodiments, dedicated circuitry includes digital and/or analog hardware circuits and may include integrated circuits (IC) and/or discrete circuits. In some embodiments, programmable circuitry includes reconfigurable hardware circuits comprising logical AND, OR XOR, NAND, NOR, and other logical operations, flip-flops, registers, memory elements, etc., such as field-programmable gate arrays (FPGA), programmable logic arrays (PLA), etc.

Various embodiments of the present system include a system, a method, and/or a computer program product. In some embodiments, the computer program product includes a computer readable storage medium (or media) having computer readable program instructions thereon for causing a processor to carry out aspects of the present system. In some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. In some embodiments, computer readable program instructions described herein are downloadable to respective computing/processing devices from a computer readable storage medium or to an external computer or external storage device via a network, for example, the Internet, a local area network, a wide area network and/or a wireless network. In some embodiments, the network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, the computer readable program instructions are executed entirely on the user's computer, partly on the user's computer, as a stand-alone software package, partly on the user's computer and partly on a remote computer or entirely on the remote computer or server. In some embodiments, in the latter scenario, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present system.

While embodiments of the present system have been described, the technical scope of any subject matter claimed is not limited to the above-described embodiments. It will be apparent to persons skilled in the art that various alterations and improvements can be added to the above-described embodiments. It will also be apparent from the scope of the claims that the embodiments added with such alterations or improvements are included in the technical scope of the system.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the processes must be performed in this order.

While embodiments of the present system have been described, the technical scope of any subject matter claimed is not limited to the above-described embodiments. It will be apparent to persons skilled in the art that various alterations and improvements can be added to the above-described embodiments. It will also be apparent from the scope of the claims that the embodiments added with such alterations or improvements are included in the technical scope of the system. The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the processes must be performed in this order.

An aspect of this description relates to a computer-readable medium including instructions executable by a computer to cause the computer to perform operations including determine test locations based on a network parameter. The instructions further cause the computer to perform an operation to determine a subset of the test locations that do not have a point test equipment. The instructions further cause the computer to perform an operation to determine a drive test route to travel into an area serviced by each of the subset of the test locations. The instructions further cause the computer to perform an operation to receive a notification from a drive test equipment in response to the drive test equipment arriving at a first test location on the drive test route. The instructions further cause the computer to perform an operation to send test parameters to the drive test equipment. The instructions further cause the computer to perform an operation to receive a drive test result from the drive test equipment. The instructions further cause the computer to perform an operation to determine whether the drive test results meet a drive test specification. The instructions further cause the computer to perform an operation to send a request to the drive test equipment to relocate to a second test location on the drive test route in response to a determination that the drive test results meet the drive test specification. In some embodiments, the instructions executable by the computer are configured to cause the computer to determine a set of signal parameters based on the drive test result; and generate a visual representation of the signal parameters based on the drive test data. In some embodiments, the instructions executable by the computer are configured to cause the computer to determine a set of signal parameters based on the drive test result; and determine a set of locations for further testing based on the set of signal parameters. In some embodiments, the instructions executable by the computer are configured to cause the computer to send test parameters to the point test equipment at test locations of the test locations that the point test equipment; receive a point test result from the point test equipment; and determine whether the point test results meet a point test specification. In some embodiments, the instructions executable by the computer are configured to cause the computer to determine a set of signal parameters based on the point test result and the drive test result; and determine a set of locations for further testing based on the set of signal parameters. In some embodiments, the instructions executable by the computer are configured to cause the computer to determine a set of signal parameters based on the point test result; and determine a set of locations for further testing based on the set of signal parameters. In some embodiments, the instructions executable by the computer are configured to cause the computer to determine a set of signal parameters based on the point test result and the drive test result; and generate a visual representation of the signal parameters for display on a graphical user interface. In some embodiments, the instructions executable by the computer are configured to cause the computer to receive information about the network parameters via a graphical user interface.

An aspect of this description relates to a method. The method includes determining a set of test locations based on a network parameter. The method further includes determining a subset of the test locations that do not have a point test equipment. The method further includes determining a drive test route to cover an area serviced by each the subset of the test locations. The method further includes receiving a notification from a drive test equipment in response to the drive test equipment arriving at a first test location on the drive test route. The method further includes sending test parameters to the drive test equipment. The method further includes receiving a drive test result from the drive test equipment. The method further includes determining whether the drive test results meet a drive test specification. The method further includes requesting the drive test equipment to relocate to a second test location on the drive test route in response to a determination that the drive test results meet the drive test specification. In some embodiments, the method further includes determining a set of signal parameters based on the drive test result; and generating a visual representation of the signal parameters based on the drive test data. In some embodiments, the method further includes determining a set of signal parameters based on the drive test result; and determining a set of locations for further testing based on the set of signal parameters. In some embodiments, the method further includes sending test parameters to the point test equipment at test locations of the test locations that have the point test equipment; receiving a point test result from the point test equipment; and determining whether the point test results meet a point test specification. In some embodiments, the method further includes determining a set of signal parameters based on the drive test result; and determining a set of locations for further testing based on the set of signal parameters. In some embodiments, the method further includes determining a set of signal parameters based on the point test result; and determining a set of locations for further testing based on the set of signal parameters. In some embodiments, the method further includes receiving information about the network parameters via a graphical user interface.

An aspect of this description relates to a system. The system includes a controller including circuitry configured to determine a set of test locations based on a network parameter. The controller is further configured to determine a subset of the test locations that do not have a point test equipment. The controller is further configured to determine a drive test route to cover an area serviced by each the subset of the test locations. The controller is further configured to receive a notification from a drive test equipment in response to the drive test equipment arriving at a first test location on the drive test route. The controller is further configured to send test parameters to the drive test equipment. The controller is further configured to receive a drive test result from the drive test equipment. The controller is further configured to determine whether the drive test results meet a drive test specification. The controller is further configured to send a request to the drive test equipment to relocate to a second test location on the drive test route in response to a determination that the drive test results meet the drive test specification. In some embodiments, the controller is configured to determine a set of signal parameters based on the drive test result; and generate a visual representation of the signal parameters based on the drive test data. In some embodiments, the controller is configured to retrieve a list of active alarms and a list of closed alarms; and send test parameters to point test equipment at test locations of the test locations that has the point test equipment; receive a point test result from the point test equipment; and determine whether the point test results meet a point test specification. In some embodiments, the controller is configured to determine a set of signal parameters based on the point test result and the drive test result; and determine a set of locations for further testing based on the set of signal parameters. In some embodiments, the controller is configured to determine a set of signal parameters based on the point test result; and determine a set of locations for further testing based on the set of signal parameters.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer-readable storage medium including instructions executable by a computer to cause the computer to perform operations comprising:
    determine test locations based on a network parameter;
    determine a subset of the test locations that do not have a point test equipment;
    determine a drive test route to travel into an area serviced by each of the subset of the test locations;

receive a notification from a drive test equipment in response to the drive test equipment arriving at a first test location on the drive test route;

send test parameters to the drive test equipment;

receive a drive test result from the drive test equipment;

determine whether the drive test results meet a drive test specification; and send a request to the drive test equipment to relocate to a second test location on the drive test route in response to a determination that the drive test results meet the drive test specification.

2. The computer-readable storage medium of claim 1, wherein the instructions executable by the computer are configured to cause the computer to:

determine a set of signal parameters based on the drive test result;

generate a visual representation of the signal parameters based on the drive test data.

3. computer-readable storage medium of claim 1, wherein the instructions executable by the computer are configured to cause the computer to:

determine a set of signal parameters based on the drive test result; and determine a set of locations for further testing based on the set of signal parameters.

4. The computer-readable storage medium of claim 1, wherein the instructions executable by the computer are configured to cause the computer to:

send test parameters to the point test equipment at test locations of the test locations that the point test equipment;

receive a point test result from the point test equipment; and determine whether the point test results meet a point test specification.

5. The computer-readable storage medium of claim 4, wherein the instructions executable by the computer are configured to cause the computer to:

determine a set of signal parameters based on the point test result and the drive test result; and determine a set of locations for further testing based on the set of signal parameters.

6. The computer-readable storage medium of claim 4, wherein the instructions executable by the computer are configured to cause the computer to:

determine a set of signal parameters based on the point test result; and determine a set of locations for further testing based on the set of signal parameters.

7. The computer-readable storage medium of claim 4, wherein the instructions executable by the computer are configured to cause the computer to:

determine a set of signal parameters based on the point test result and the drive test result; and generate a visual representation of the signal parameters for display on a graphical user interface.

8. The computer-readable medium of claim 1, wherein the instructions executable by the computer are configured to cause the computer to:

receive information about the network parameters via a graphical user interface.

9. A method comprising:

determining a set of test locations based on a network parameter;

determining a subset of the test locations that do not have a point test equipment;

determining a drive test route to cover an area serviced by each the subset of the test locations;

receiving a notification from a drive test equipment in response to the drive test equipment arriving at a first test location on the drive test route;

sending test parameters to the drive test equipment;

receiving a drive test result from the drive test equipment;

determining whether the drive test results meet a drive test specification; and requesting the drive test equipment to relocate to a second test location on the drive test route in response to a determination that the drive test results meet the drive test specification.

10. The method of claim 9, further comprising:

determining a set of signal parameters based on the drive test result; and generating a visual representation of the signal parameters based on the drive test data.

11. The method of claim 9, further comprising:

determining a set of signal parameters based on the drive test result; and determining a set of locations for further testing based on the set of signal parameters.

12. The method of claim 9, further comprising:

sending test parameters to the point test equipment at test locations of the test locations that have the point test equipment;

receiving a point test result from the point test equipment; and determining whether the point test results meet a point test specification.

13. The method of claim 12, further comprising:

determining a set of signal parameters based on the drive test result; and determining a set of locations for further testing based on the set of signal parameters.

14. The method of claim 12, further comprising:

determining a set of signal parameters based on the point test result; and determining a set of locations for further testing based on the set of signal parameters.

15. The method of claim 9, further comprising:

receiving information about the network parameters via a graphical user interface.

16. A system comprising:

a controller including circuitry configured to:

determine a set of test locations based on a network parameter;

determine a subset of the test locations that do not have a point test equipment;

determine a drive test route to cover an area serviced by each the subset of the test locations;

receive a notification from a drive test equipment in response to the drive test equipment arriving at a first test location on the drive test route;

send test parameters to the drive test equipment;

receive a drive test result from the drive test equipment;

determine whether the drive test results meet a drive test specification; and send a request to the drive test equipment to relocate to a second test location on the drive test route in response to a determination that the drive test results meet the drive test specification.

17. The system of claim 16, wherein the controller is configured to:

determine a set of signal parameters based on the drive test result; and generate a visual representation of the signal parameters based on the drive test data.

18. The system of claim 16, wherein the controller is configured to:
- retrieve a list of active alarms and a list of closed alarms; and
- send test parameters to point test equipment at test locations of the test locations that has the point test equipment;
- receive a point test result from the point test equipment; and
- determine whether the point test results meet a point test specification.

19. The system of claim 18, wherein the controller is configured to:
- determine a set of signal parameters based on the point test result and the drive test result; and
- determine a set of locations for further testing based on the set of signal parameters.

20. The system of claim 18, wherein the controller is configured to:
- determine a set of signal parameters based on the point test result; and
- determine a set of locations for further testing based on the set of signal parameters.

\* \* \* \* \*